(12) United States Patent
Hiramatsu

(10) Patent No.: US 7,354,014 B2
(45) Date of Patent: Apr. 8, 2008

(54) SEAT BELT RETRACTOR

(75) Inventor: Koji Hiramatsu, Shiga-ken (JP)

(73) Assignee: Takata Corporation, Tokyo (JP)

( * ) Notice: Subject to any disclaimer, the term of this patent is extended or adjusted under 35 U.S.C. 154(b) by 241 days.

(21) Appl. No.: 10/825,667

(22) Filed: Apr. 16, 2004

(65) Prior Publication Data

US 2004/0262441 A1    Dec. 30, 2004

(30) Foreign Application Priority Data

Jun. 27, 2003 (JP) ............................ 2003-184648
Jan. 15, 2004 (JP) ............................ 2004-007563

(51) Int. Cl.
*B60R 22/28* (2006.01)
*B60R 22/36* (2006.01)
*B60R 22/46* (2006.01)

(52) U.S. Cl. ..................... 242/379.1; 242/374; 242/382

(58) Field of Classification Search ................ 242/382, 242/384, 374, 379.1; 280/805; 297/472, 297/476, 478
See application file for complete search history.

(56) References Cited

U.S. PATENT DOCUMENTS

| | | | |
|---|---|---|---|
| 3,881,667 A * | 5/1975 | Tandetzke | 242/384.3 |
| 5,511,739 A | 4/1996 | Dybro et al. | |
| 5,785,269 A * | 7/1998 | Miller et al. | 242/379.1 |
| 5,823,570 A * | 10/1998 | Lane et al. | 280/806 |
| 5,836,534 A | 11/1998 | Böhmler | |
| 5,967,441 A * | 10/1999 | Kohlndorfer et al. | 242/379.1 |
| 5,984,223 A | 11/1999 | Hiramatsu | |
| 6,206,315 B1 | 3/2001 | Wier | |
| 6,416,008 B1 * | 7/2002 | Fujii et al. | 242/379.1 |
| 6,692,027 B2 * | 2/2004 | Siegfried et al. | 280/805 |
| 2002/0070307 A1 * | 6/2002 | Hiramatsu et al. | 242/379.1 |

FOREIGN PATENT DOCUMENTS

| | | |
|---|---|---|
| EP | 0 919 747 | 6/1999 |
| JP | 10-35411 | 2/1998 |
| JP | 10-258702 | 9/1998 |
| JP | 11-59330 | 3/1999 |
| JP | 2000-16243 | 1/2000 |
| JP | 2000-43677 | 2/2000 |

* cited by examiner

*Primary Examiner*—Peter M. Cuomo
*Assistant Examiner*—Scott Haugland
(74) *Attorney, Agent, or Firm*—Manabu Kanesaka

(57) ABSTRACT

A seat belt retractor includes a spool for winding a seat belt; a lock mechanism having a locking member for rotation with the spool in a normal state and for stop-rotation in a seat belt withdrawal direction in an emergency state; a torsion bar disposed between the spool and the locking member for absorbing energy of a passenger when the spool rotates in the seat belt withdrawal direction relative to the locking member in the emergency state; a stopper screwed in a shaft of the locking member to be movable in an axial direction along the shaft of the locking member when the spool rotates relative to the locking member; and an energy-absorption member disposed on one of the stopper and the locking member for deforming in a shear mode when the stopper moves in the axial direction along the shaft of the locking member.

8 Claims, 4 Drawing Sheets

SEAT BELT RETRACTOR

BACKGROUND OF THE INVENTION AND RELATED ART STATEMENT

The present invention relates to a seat belt retractor installed in a vehicle such as an automobile for retracting and withdrawing a seat belt. More specifically, the present invention relates to a seat belt retractor with an energy absorption mechanism (hereafter referred to as EA mechanism) for absorbing energy applied to a passenger moving due to inertia. The energy is absorbed by the seat belt when withdrawal of the seat belt is prevented in an emergency situation such as a crash when a large deceleration force is applied on a vehicle while the passenger is wearing the seat belt.

A conventional seat belt apparatus installed in a vehicle such as an automobile comprises a seat belt retractor for retracting a seat belt, a seat belt retractable from the seat belt retractor and having an end fixed to a vehicle body, a buckle fixed to the vehicle body, and a tongue for slidably inserting the seat belt and engaging the buckle.

When the passenger is not wearing the seat belt, the seat belt is wound on a spool of the seat belt retractor. After the passenger is seated in a vehicle seat, the passenger wears the seat belt by withdrawing a predetermined length of the seat belt from the seat belt retractor and inserting the tongue into the buckle. When the passenger is wearing the seat belt, the seat belt extending from the tongue to the seat belt retractor functions as a shoulder belt passing over a shoulder to a chest of the passenger. The seat belt extending from the tongue to the connection with the vehicle functions as a lap belt passing around the passenger hip.

When the passenger is wearing the seat belt, the seat belt is prevented from being withdrawn in an emergency situation when a lock mechanism of the seat belt retractor is activated to stop the rotation of the spool in the seat belt withdrawal direction. The shoulder belt of the seat belt apparatus restrains the shoulder and the chest of the passenger, and the lap belt restrains the passenger hip. In this way, the passenger is protected from being thrown off the seat.

Such a seat belt retractor in the conventional seat belt apparatus has the seat belt for restraining and protecting the passenger in an emergency situation such as a crash. During a crash, the vehicle decelerates rapidly, and due to the large inertia, the passenger moves forward. Therefore, large load is applied to the seat belt due to kinetic energy of the passenger.

The seat belt retractor in the conventional seat belt apparatus has a torsion bar for absorbing the kinetic energy applied in the emergency situation when the passenger is wearing the seat belt. As a result, the load applied to the seat belt is reduced.

FIG. 5 is a sectional view of a seat belt retractor having such a torsion bar. In FIG. 5, reference numeral 1 indicates a seat belt retractor; reference numeral 2 indicates a U-shaped frame; reference numeral 3 indicates a seat belt; reference numeral 4 indicates a spool rotatably disposed between sidewalls of the U-shaped frame 2 for retracting the seat belt 3; reference numeral 5 indicates a deceleration sensing mechanism for sensing rapid deceleration of a vehicle in an emergency situation; reference numeral 6 indicates a lock mechanism to be activated in response to the deceleration sensing mechanism 5 to prevent the spool 4 from rotating in the seat belt withdrawal direction; reference numeral 7 indicates a torsion bar loosely passing through the center of the spool 4 in the axial direction and connecting the spool 4 and the lock mechanism 6; reference numeral 8 indicates a spring mechanism for constantly urging the spool 4 in the seat belt retraction direction with a bush 10 by the spring force of a spiral spring 9; reference numeral 11 indicates a pretensioner to be activated in the emergency situation for generating torque for retracting the seat belt; and reference numeral 12 indicates a bush for transferring the torque for retracting the seat belt generated by the pretensioner 11 to the spool 4.

The lock mechanism 6 has a locking base 14 (locking member). The locking base 14 is fixed to and integrally rotatable with a first torque transferring shaft 17 of the torsion bar 7, and loosely supports a pawl 13. The torsion bar 7 has a locking gear 6a. Normally, the locking gear 6a integrally rotates with the torsion bar 7. In an emergency situation, the deceleration sensing mechanism 5 is activated to stop the locking gear 6a, so that a rotational difference is generated between the locking gear 6a and the torsion bar 7. The rotational difference causes the pawl 13 to engage an inner tooth 19 on the sidewall of the frame 2, so that the rotation of the locking base 14, i.e. the spool 4, in the seat belt withdrawal direction is stopped.

The torsion bar 7 engages the first torque transferring shaft 17 not to rotate relative to the locking base 14. The torsion bar 7 also engages a second torque transferring shaft 18 not to rotate relative to the spool 4. A circular stopper 15 is interposed between the spool 4 and a shaft 14a of the locking base 14. A female screw 15a formed on the inner circumference of the stopper 15 is screwed together with a male screw 14c formed on the shaft 14a of the locking base 14. The stopper 15 is prevented from rotating relative to an axial hole formed on the spool 4, and is movable in the axial direction of the spool 4. The rotation of the spool 4 in the seat belt withdrawal direction relative to the locking base 14 causes the stopper 15 to integrally rotate with the spool 4 and move to the right in FIG. 5.

The spring mechanism 8 constantly urges the spool 4 in the seat belt retraction direction via the bush 10, the torsion bar 7, the second torque-transferring shaft 18 of the torsion bar 7, and the bush 12. When the pretensioner 11 is activated, seat belt retraction torque generated by the pretensioner 11 is transferred to the spool 4 via the bush 12, so that the spool 4 retracts the seat belt 3 by a predetermined length.

As described above, the seat belt retractor 1 holds the seat belt 3 with the force of the spring mechanism 8 when a passenger is not wearing the seat belt 3. When the passenger withdraws the seat belt 3 at a normal speed to wear the seat belt 3, the spool 4 rotates in the seat belt withdrawal direction and the seat belt 3 is withdrawn smoothly. A tongue (not shown) is slidably attached to the seat belt 3. After the tongue is inserted and latched into a buckle fixed to the vehicle, an excess portion of the seat belt 3 is retracted on the spool 4 with the force of the spring mechanism 8. In this way, the seat belt 3 fits tightly to the passenger and the passenger does not feel too much pressure.

In an emergency situation, the pretensioner 11 transfers the generated seat belt retraction torque to the spool 4. The spool 4 retracts the seat belt 3 by a predetermined length and restrains the passenger quickly. When the vehicle quickly decelerates during the emergency situation, the deceleration sensing mechanism 5 is activated to activate the lock mechanism 6. More specifically, the activation of the deceleration sensing mechanism 5 prevents the rotation of the locking gear 6a in the seat belt withdrawal direction. Then, the pawl 13 of the lock mechanism 6 rotates and engages the inner tooth 19 of the sidewall of the frame 2. As a result, the rotation of the locking base 14 in the seat belt withdrawal direction is stopped, so that the torsion bar 7 twists and the spool 4 rotates in the seat belt withdrawal direction relative to the locking base 14. After this, the spool 4 rotates in the seat belt withdrawal direction while the torsion bar 7 twists. The twisting torque absorbs the kinetic energy of the passenger, and, consequently, the seat belt 3 generates limited load. The torsion bar 7 functions as an EA mechanism. The load of the EA mechanism (hereafter referred to as EA load) controlled by the torsion bar 7 increases first with a rotational speed of the spool 4 relative to the locking base 14, and then levels off.

When the spool 4 rotates in the seat belt withdrawal direction relative to the locking base 14, the stopper 15 moves to the right along the shaft as shown in FIG. 5. When the stopper 15 reaches an end of the male screw of the locking base 14, the stopper 15 does not move any further to the right. Accordingly, the rotation of the stopper 15 is locked, so that the stopper 15 does not rotate relative to the locking base 14. When the stopper 15 contacts a side of a flange 14b of the locking base 14, the stopper 15 is also stopped in the right axial direction. Accordingly, the spool 4 does not rotate relative to the locking base 14. More specifically, the spool 4 is locked not to rotate in the seat belt withdrawal direction, and the seat belt 3 is not withdrawn. In this way, the seat belt 3 stops the passenger moving due to inertia.

In the conventional seat belt retractor, when the seat belt is suddenly withdrawn, the locking base 14 of the lock mechanism 6 rotates in the seat belt withdrawal direction relative to the locking gear 6a. The pawl 13 of the lock mechanism 6 engages the inner tooth 19 on the sidewall of the frame 2 as described above. As a result, the rotation of the locking base 14 is locked, so that the torsion bar 7 stops the spool 4 not to rotate in the seat belt withdrawal direction. Consequently, the withdrawal of the seat belt 3 is prevented.

In the conventional seat belt retractor, only the torsion bar 7 generates the EA load for absorbing the kinetic energy of the passenger. To minimize the load applied to the passenger, a minimum and constant EA load for absorbing the kinetic energy of the passenger is selected.

As described above, the torsion bar 7 absorbs the kinetic energy of the passenger in an emergency situation. It is preferable that the kinetic energy of the passenger be absorbed as effectively and appropriately as possible. To effectively absorb the kinetic energy, various methods for providing variable EA load have been proposed.

As an example of a seat belt retractor having such an EA mechanism with variable EA load, a seat belt retractor having a second torsion bar disposed inside a cylindrical first torsion bar has been disclosed in Japanese Patent Publication (Kokai) No. 2000-16243 and Japanese Patent Publication (Kokai) No. 2000-25567. In the seat belt retractor, the first and the second torsion bars are connected at corresponding ends thereof on the same sides in the rotational direction. In an emergency situation, at first both of the torsion bars twist and deform to absorb a large amount of energy. When the first torsion bar breaks, only the second torsion bar twists to absorb the kinetic energy. In this way, the EA load changes in two steps.

As another example of the conventional seat belt retractor including the EA mechanism with variable EA load, Japanese Patent Publication (Kokai) No. 10-258702 has disclosed a seat belt retractor having a shaft disposed inside a cylindrical spool for retracting webbing and a bifacial curved EA plate with a controller interposed between the spool and the shaft. One end of the EA plate receives the rotational force of the spool in the webbing retraction direction, and the other end thereof is fixed to the shaft. In the seat belt retractor, the spool rotates in the webbing withdrawal direction relative to the shaft in an emergency situation. The rotational force of the spool in the webbing withdrawal direction is applied to the one end of the EA plate, so that the EA plate plastically deforms. As a result, the kinetic energy is absorbed and the deformation force is changed through the controller. In other words, the amount of energy absorption is changed, and the EA load is variable.

As a further example of the conventional seat belt retractor including the EA mechanism with variable EA load, Japanese Patent Publication (Kokai) No. 2000-43677 has disclosed a seat belt retractor having a torsion bar disposed inside a spool and a stopper ring disposed on a side of the spool. In the seat belt retractor, the spool rotates relative to a pawl holder in the webbing withdrawal direction during an emergency situation. As a result, the torsion bar twists, and then an engagement shoulder of the pawl holder cuts an inner circumference of the stopper ring. In this way, a large amount of the kinetic energy is absorbed. Once the inner circumference of the stopper ring is cut completely, the kinetic energy is absorbed only by the torsion bar. In this way, the EA load changes in two steps.

In the EA mechanism having two torsion bars disclosed in Japanese Patent Publication (Kokai) No. 2000-16243 and Japanese Patent Publication (Kokai) No. 2000-25567, the first torsion bar has an axial length same as that of the second torsion bar, i.e. a main torsion bar. Accordingly, the EA load depends on the axial length of the second torsion bar. For this reason, it is possible to change the EA load within a limited range, and it is difficult to set an arbitrary EA load regardless of the axial length of the second torsion bar.

The EA mechanism composed of the EA plate having the controller disclosed in Japanese Patent Publication (Kokai) No. 10-258702 has a complex shape because the EA plate is formed of a bifacial curved surface. Further, the EA mechanism has a complex structure. In addition to the complex shapes and structures of the EA plate and the EA mechanism, it is necessary to from the controller through local curing, thereby making it difficult to provide stable EA load.

In the EA mechanism made by the cutting disclosed in Japanese Patent Publication (Kokai) No. 2000-43677, it is difficult to provide constant stable EA load through the cutting of the inner circumference of the stopper ring.

In view of the problems describe above, the present invention has been made, and an object of the invention is to provide a seat belt retractor with a relatively simple structure and capable of setting a wide range of EA load with great stability.

Further objects and advantages of the invention will be apparent from the following description of the invention.

SUMMARY OF THE INVENTION

In order to achieve the objects described above, according to a first aspect of the present invention, a seat belt retractor includes a spool for winding a seat belt; a lock mechanism having a locking member rotatable with the spool in a normal state and to be stopped rotating in a seat belt withdrawal direction in an emergency state; a torsion bar disposed between the spool and the locking member for absorbing energy of a passenger when the spool rotates in the seat belt withdrawal direction relative to the locking member in the emergency state; and a stopper screwed in a shaft of the locking member and moving in an axial direction along the shaft of the locking member when the spool rotates relative to the locking member. The stopper stops the spool not to rotate when the locking member locks the stopper not to move in the axial direction. The seat belt retractor further includes an energy-absorption member disposed on at least one of the stopper and the locking member for deforming in a shear mode between the stopper and the locking member when the stopper moves in the axial direction along the shaft of the locking member.

According to a second aspect of the present invention, the energy-absorption member is formed in one of a column, prism, and tabular shape.

According to a third aspect of the present invention, the torsion bar and the energy-absorption members are disposed independently.

According to a fourth aspect of the present invention, a cutter is disposed on one of the stopper and the locking member for cutting the energy-absorption member when the stopper moves along the shaft of the locking member in the axial direction.

According to a fifth aspect of the present invention, the cutter has an edge with an acute angle (cutting blade).

In the first to fifth aspects of the present invention, the seat belt retractor is provided with the torsion bar and the energy-absorption member as a kinetic energy-absorption mechanism. Accordingly, it is possible to change the EA load in two different modes, i.e. controlled load caused by the twisting of the torsion bar and the shear deformation of the energy-absorption member before the energy-absorption member breaks, and controlled load caused by the twisting of the torsion bar after the energy-absorption member breaks.

The energy-absorption member may be attached to a conventional seat belt retractor to form the seat belt retractor, thereby making the EA mechanism with variable EA load simple and inexpensive. It is possible to adjust the EA load through changing a pitch of the screwed part of the stopper relative to the locking base or changing a shape of the energy-absorption member, thereby making it easy to adjust the EA load. It is arranged such that the energy-absorption member sequentially deforms in a shear mode, thereby stabilizing the EA load.

In the second aspect of the present invention, the energy-absorption member is formed in one of the column, prism, and tabular shape. Accordingly, the EA mechanism with variable EA load has a simple structure, thereby reducing cost of production of the EA mechanism.

In the third aspect of the present invention, the torsion bar and the energy-absorption member are independently disposed, thereby making it easy to adjust the EA load.

In the fourth aspect of the present invention, the cutter cuts the energy-absorption member, thereby stabilizing cutting load of the energy-absorption member. Accordingly, it is possible to stabilize the EA load and absorb the kinetic energy of the passenger efficiently. When the stopper rotates relative to the locking base, the energy-absorption member is cut without rotating the cutter, thereby stabilizing the cutting load of the energy-absorption member. The cutter for cutting the energy-absorption member is formed separately from the stopper, so that the cutter is formed of an optimum material for cutting the energy-absorption member regardless of a material of the stopper.

In the fifth aspect of the present invention, the cutter has the sharp edge (cutting blade), thereby stabilizing the cutting load of the energy-absorption member.

BRIEF DESCRIPTION OF THE DRAWINGS

FIGS. 2(a) and 2(b) are views showing an energy-absorption pin as an energy-absorption member, wherein FIG. 2(a) is a view showing the energy-absorption pin shown in FIG. 1, and FIG. 2(b) is a view showing a modified example of the energy-absorption pin;

FIGS. 3(a) and 3(b) are views showing a characteristic of EA load, wherein FIG. 3(a) shows an EA load characteristic of the embodiment shown in FIG. 1, and FIG. 3(b) shows an EA load characteristic of a modified example;

DETAILED DESCRIPTION OF PREFERRED EMBODIMENTS

Figure 1:
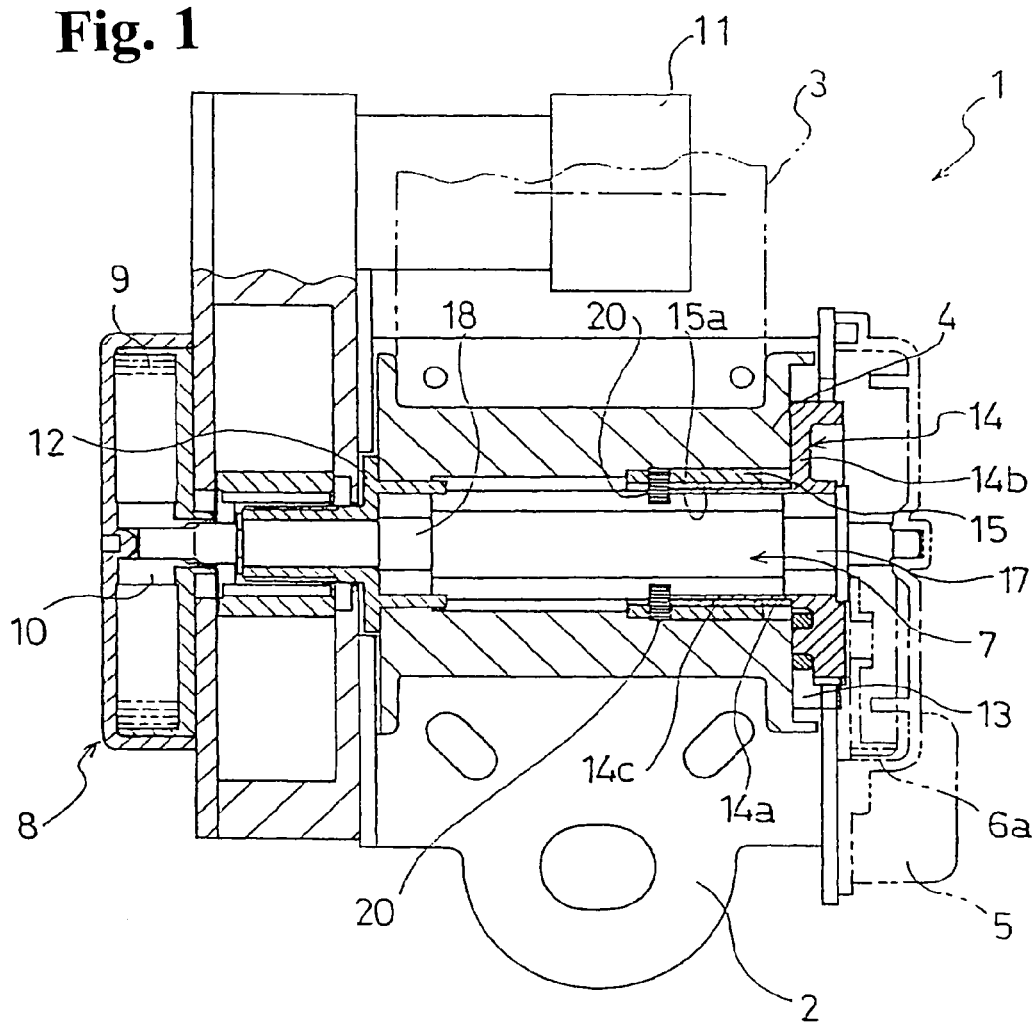
FIG. 1 is a sectional view of a seat belt retractor according to an embodiment of the present invention.
Figure 5:
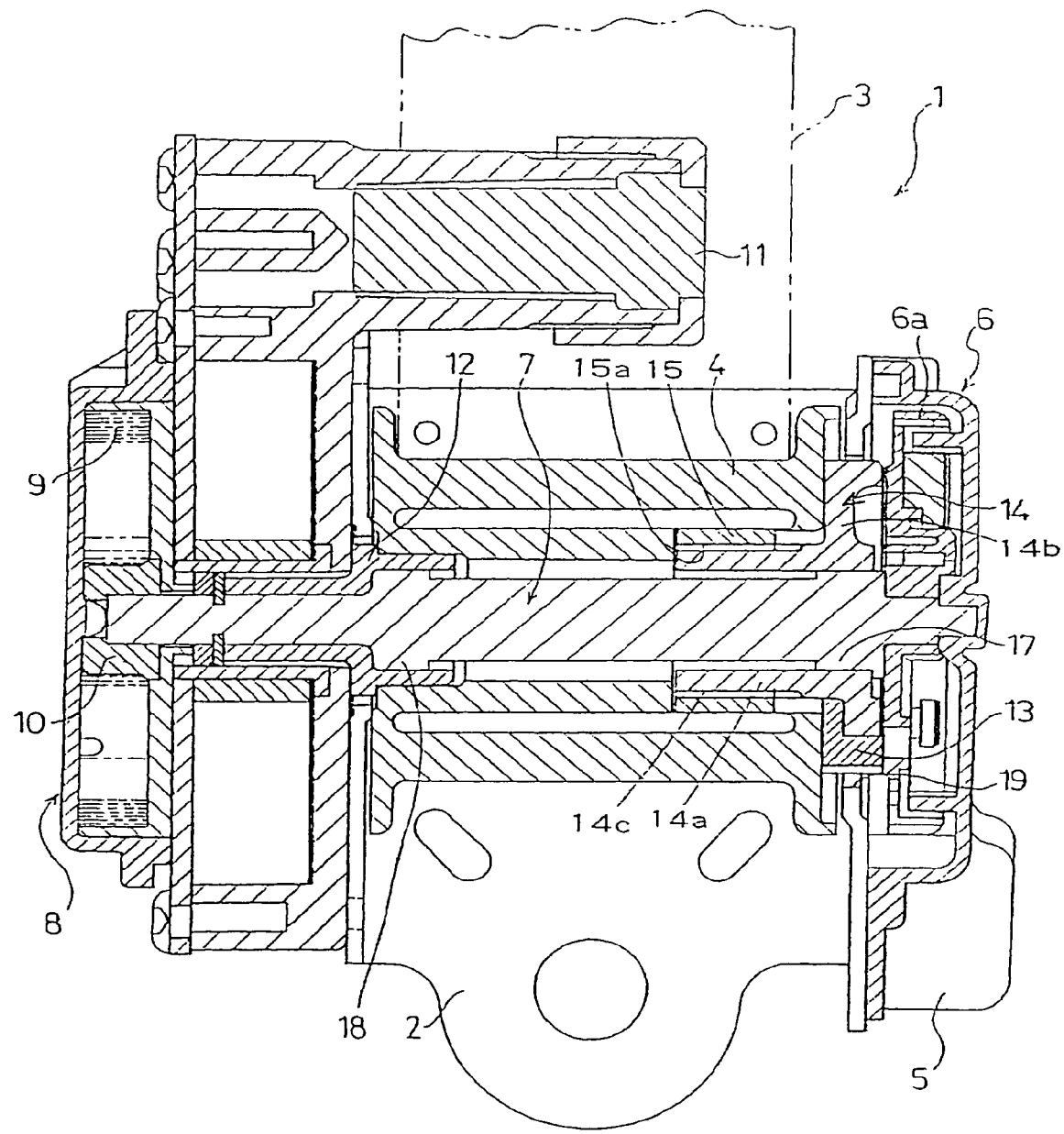
FIG. 5 is a sectional view of a conventional seat belt retractor having an EA mechanism.

Hereunder, embodiments of the present invention will be described with reference to the accompanying drawings. FIG. 1 is a sectional view of a seat belt retractor according to an embodiment of the present invention. In the following description, components same as those of a conventional seat belt retractor shown in FIG. 5 are indicated by the same reference numerals, and their explanations are omitted. Right and left in the description represent right and left in the drawings.

As shown in FIG. 1, in a seat belt retractor according to the embodiment, a stopper 15 extends leftward from a left end of a shaft 14a of a locking base 14 in a normal state. On the extended portion of the stopper 15, a predetermined number of columnar energy-absorption pins 20 are disposed on a circumference of the stopper 15 with an equal interval and protrude inwardly in a radial direction as energy-absorption members (EA members). The energy-absorption pins 20 are disposed separately from a torsion bar 7.

Figure 2A:
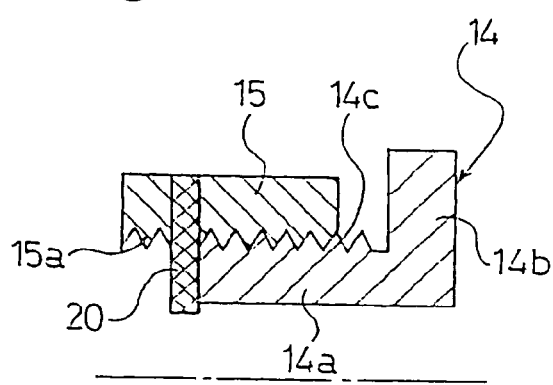

As shown in FIG. 2(a), the energy-absorption pins 20 are connected to a left end of the shaft 14a of the locking base 14. The seat belt retractor has an EA mechanism formed of the energy-absorption pins 20 and the torsion bar 7. The remaining structure of the seat belt retractor according to the embodiment is the same as that of the conventional seat belt retractor shown in FIG. 5.

Similar to the conventional seat belt retractor shown in FIG. 5, in the seat belt retractor according to the embodiment, a spool 4 rotates in a seat belt withdrawal direction and the torsion bar 7 twists in an emergency situation. The twisting torque of the torsion bar 7 absorbs kinetic energy of a passenger and limits load applied to the seat belt in an emergency state. At the same time, the stopper 15 tries to move to the right relative to the shaft 14a of the locking base 14. Therefore, shear load is applied to the energy-absorption pins 20 to deform in a shear mode. As the shear load increases, the energy-absorption pins 20 finally undergo shear failure. The shear deformation and shear failure of the energy-absorption pins 20 further absorb the kinetic energy of the passenger and limit the load applied to the seat belt 3.

After the energy-absorption pins 20 undergo the shear failure, similar to the conventional seat belt retractor shown in FIG. 5, only the twisting of the torsion bar 7 absorbs the kinetic energy, and the stopper 15 moves rightward relative to the shaft 14a of the locking base 14.

Figure 3A:
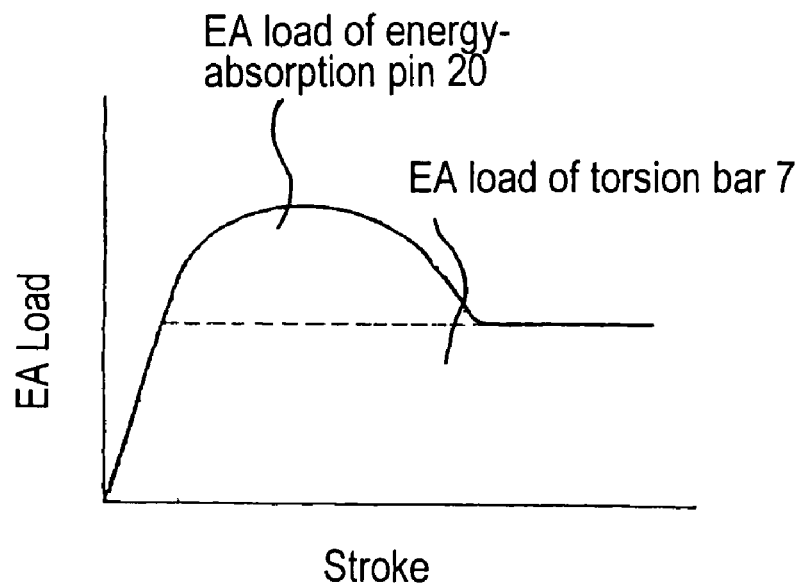

The EA mechanism has the following characteristic of the EA load. As shown in FIG. 3(a), as a stroke of the spool 4 relative to the locking base 14 increases, the EA load controlled through the twisting of the torsion bar 7 and the shear deformation of the energy-absorption pins 20 gradually increases. In this stage, the EA load is greater than EA load generated only by the twisting of the torsion bar 7 shown by hidden line. As the shear deformation of the energy-absorption pins 20 increase and the shear failure starts, the EA load caused by the shear deformation of the energy-absorption pins 20 gradually decreases. After the energy-absorption pins 20 undergo the shear failure completely, the EA load is caused only by the twisting of the torsion bar 7 same as that in the case of the conventional seat belt retractor shown in FIG. 5. Other operations of the seat belt retractor according to the embodiment are the same as those of the conventional seat belt retractor depicted in FIG. 5.

In the seat belt retractor according to the embodiment, the EA load is changed in two different types of the load, i.e. the controlled EA load caused by the twisting of the torsion bar 7 and the shear deformation of the energy-absorption pins 20, and the controlled EA load caused only by the twisting of the torsion bar 7. The seat belt retractor is formed of the energy-absorption pins 20 as the additional component to the conventional seat belt retractor. Accordingly, a relatively simple and inexpensive EA mechanism with variable EA load can be produced.

It is easy to control the EA load by changing a pitch of the female screw 15a of the stopper 15 and the male screw of the locking base 14 or changing a diameter of the energy-absorption pins 20. In particular, the EA load can be freely adjusted by disposing the torsion bar 7 and the energy-absorption pins 20 independently. The energy-absorption pins 20 undergo the shear deformation in sequence, thereby stabilizing the EA load. Other effects of the seat belt retractor according to the embodiment are the same as those of the conventional seat belt retractor shown in FIG. 5.

Figure 2B:
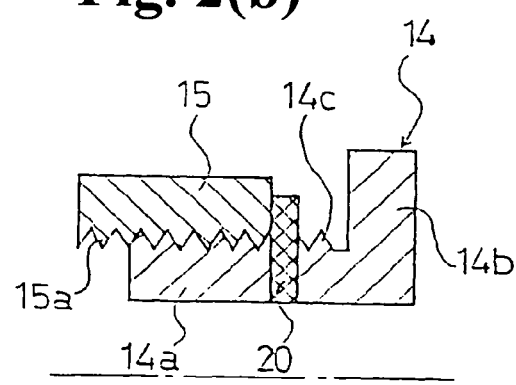

In the embodiment described above, the energy-absorption pins 20 are disposed on the stopper 15 and are connected to the left end of the shaft 14a of the locking base 14. As shown in FIG. 2(b), it is also possible to dispose the energy-absorption pins 20 on the shaft 14a of the locking base 14 and connect them to the right end of the stopper 15. Furthermore, in the embodiment described above, the energy-absorption pins 20 are connected to the shaft 14a of the locking base 14 in the initial state. It is also possible to position the energy-absorption pins 20 away from the left end of the shaft 14a of the locking base 14 in the initial state. After the stopper 15 moves for a predetermined distance towards the right relative to the shaft 14a of the locking base 14, the energy-absorption pins 20 are connected to the left end of the shaft 14a of the locking base 14 to deform in the shear mode. Accordingly, the EA load has a different characteristic.

The energy-absorption pins 20 may be formed in a prism shape instead of the column shape. Also, the energy-absorption pins 20 may have a portion to be deformed in the shear mode with a section different from that of other portion, i.e. a larger or smaller section compared to that of the other portion.

Figure 3B:
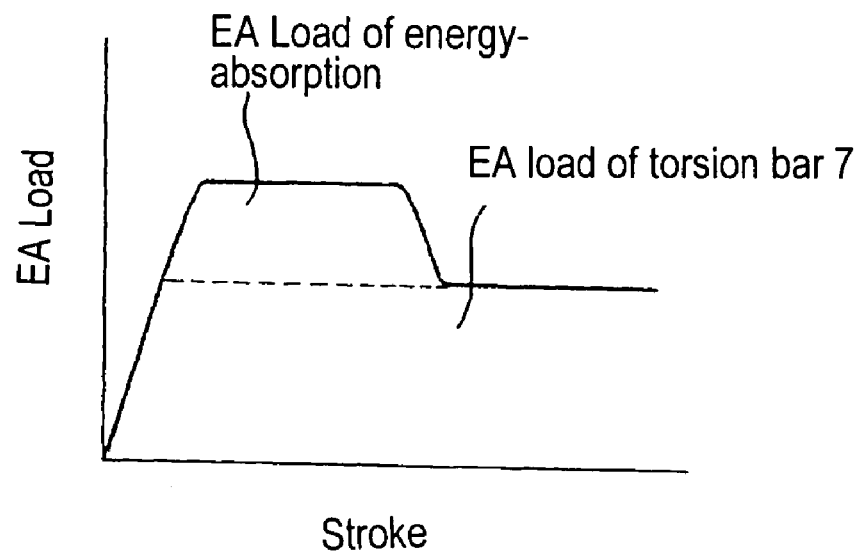

Instead of the energy-absorption pins 20 as the EA member, a plate member may be used. FIG. 3(b) shows a characteristic of the EA load when such a plate member is used. In this case, the EA load becomes almost constant after reaching a maximum load.

FIGS. 4(a) to 4(e) are views showing other modified examples of the energy-absorption pin corresponding to FIGS. 2(a) and 2(b). In the embodiments shown in FIGS. 2(a) and 2(b), a plurality of the energy-absorption pins 20 is mounted on the stopper 15 or the locking base 14. The energy-absorption pins 20 undergo the shear deformation or the shear failure due to the relative rotation of the locking base 14 or stopper 15. In the embodiments shown in FIGS. 4(a) to 4(e), the energy-absorption pins 20 are cut (sheared) by a cutter 21.

Figure 4A:
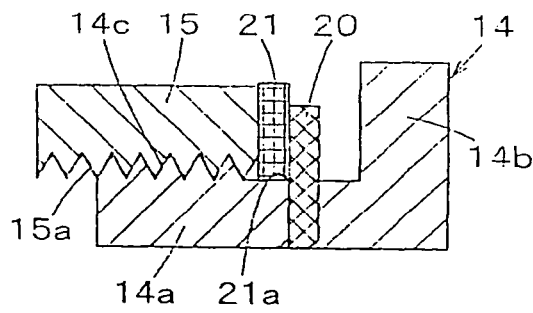
FIGS. 4(a) to 4(e) are views showing other modified examples of the energy-absorption pin corresponding to FIGS. 2(a) and 2(b)

In the embodiment shown in FIG. 4(a), the energy-absorption pin 20 is mounted on the shaft 14a of the locking base 14. A ring cutter 21 (cutter) is fit into the shaft 14a between the male screw 14c of the locking base 14 and the energy-absorption pin 20, so that the cutter 21 is movable in the axial direction of the locking base 14. An inner edge 21a of the ring cutter 21 adjacent to the energy-absorption pin 21 is a cutting blade for cutting (shearing) the energy-absorption pin 20. Other structures of the seat belt retractor according to the embodiment are the same as those the seat belt retractor described above.

When the locking base 14 and the stopper 15 relatively rotate, the stopper 15 presses the ring cutter 21 towards the right. Accordingly, the cutter 21 moves to the right and the inner edge 21a cuts (shears) the energy-absorption pin 20. As a result, the kinetic energy of the passenger is absorbed. In the seat belt retractor according to the embodiment, the energy-absorption pin 20 is cut by the inner edge 21a of the cutter 21. Thus, the cutting load of the energy-absorption pin 20 is stabilized. In this way, the EA load can be stabilized, and the kinetic energy of the passenger can be efficiently absorbed.

When the stopper 15 rotates relative to the locking base 14, the energy-absorption member can be cut without rotating the inner edge 21a by moving the cutter 21 in the axial direction without rotation. Accordingly, the cutting load of the energy-absorption member can be stabilized.

The cutter 21 for cutting the energy-absorption pin 20 is formed separately from the stopper 15. Accordingly, it is possible to form the cutter 21 with a material suitable for cutting the energy-absorption pin 20 regardless of a material of the stopper. Other effects of the seat belt retractor according to the embodiment are the same as those of the above-mentioned embodiment.

Figure 4D:
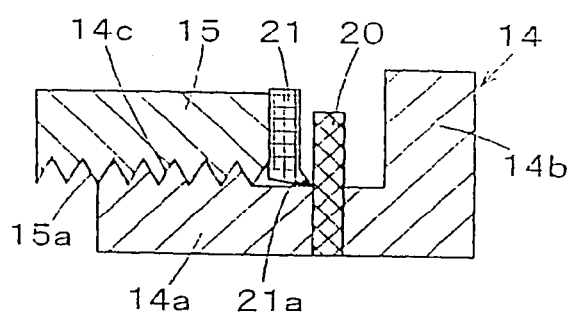
Figure 4B:
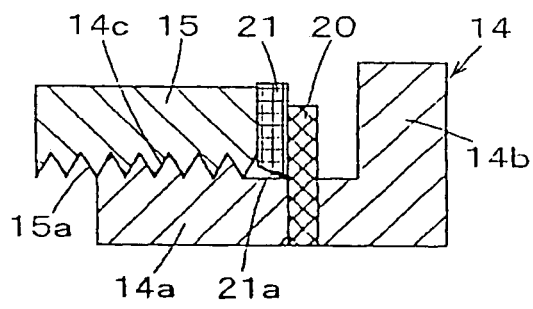
Figure 4E:
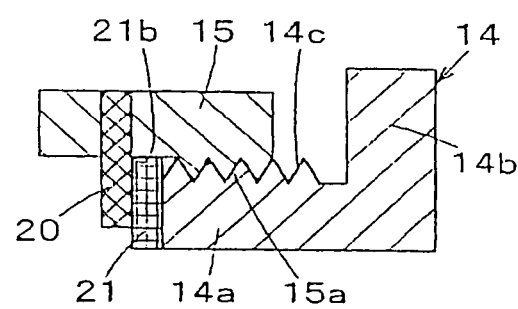

In an embodiment shown in FIG. 4(b), as compared with the embodiment shown in FIG. 4(a), an inner circumference of the ring cutter 21 is inclined relative to the axial direction, and the inner edge 21a of the cutter 21 has an acute angle. In this way, the cutting load of the energy-absorption pin 20 can be stabilized as compared with the cutting load of the embodiment shown in FIG. 4(a). Other structures and effects of the seat belt retractor according to the embodiment are the same as those of the embodiment shown in FIG. 4(a).

Figure 4C:
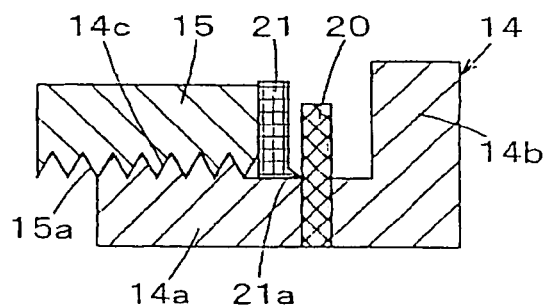

In an embodiment shown in FIG. 4(c), as compared with the embodiment shown in FIG. 4(a), the inner edge 21a of the ring cutter 21 projects in the axial direction towards the energy-absorption pin 20. In this case, the inner circumference of the cutter 21 is arranged in parallel to the peripheral surface of the shaft 14a of the locking base 14, and the inner edge 21a has an acute angle. Since the inner circumference of the cutter 21 is arranged in parallel to the shaft 14a of the locking base 14, the cutter 21 moves smoothly in the axial direction. Accordingly, the cutting of the energy-absorption pin 20 is reliable as compared with the embodiment shown in FIG. 4(b). Other structures and effects of the seat belt retractor according to the embodiment are the same as those of the embodiment shown in FIG. 4(a).

In an embodiment shown in FIG. 4(d), as compared with the embodiment shown in FIG. 4(c), the inner circumference of the ring cutter 21 is inclined relative to the axial direction, and the inner edge 21a of the cutter 21 has an acute angle. In this way, the cutting load of the energy-absorption pin 20 can be stabilized. Other structures and effects of the seat belt retractor according to the embodiment are the same as those of the embodiment shown in FIG. 4(a).

In the embodiments shown in FIGS. 4(a) to 4(d), the locking base 14 is provided with the energy-absorption pin 20, and the ring cutter 21 is fit to the locking base 14. In an embodiment shown in FIG. 4(e), the energy-absorption pin 20 is formed on the stopper 15, and the ring cutter 21 is arranged between the energy-absorption pin 20 and the left end of the shaft 14a of the locking base 14, and is fit to the stopper 15. In the embodiment, the peripheral edge 21b of the ring cutter 21 adjacent to the energy-absorption pin 20 is a cutting blade for cutting (shearing) the energy-absorption pin 20. In the embodiment shown in FIG. 4(e), similar to the embodiment shown in FIG. 4(a), the peripheral surface of the cutter 21 is arranged in parallel to the inner circumference of the stopper 15, and the peripheral edge 21b has a right angle. The peripheral edge 21b may have an acute angle similar to the inner edge 21a in the embodiments shown in FIGS. 4(a) to 4(d). Other structures and effects of the seat belt retractor according to the embodiment are substantially the same as those of the embodiments shown in FIGS. 4(a) to 4(d).

The seat belt retractor according to the embodiments of present invention is mounted on a vehicle such as an automobile to allow withdrawal and retraction of a seat belt. The seat belt retractor is suitable for use in an emergency situation such as a crash in which a large deceleration force is applied on the vehicle while a passenger is wearing the seat belt having an EA mechanism for absorbing the kinetic energy applied to the passenger in inertial movement by preventing the withdrawal of the seat belt.

While the invention has been explained with reference to the specific embodiments of the invention, the explanation is illustrative and the invention is limited only by the appended claims.

What is claimed is:

1. A seat belt retractor for winding and unwinding a seat belt, comprising:
    a spool for winding and unwinding the seat belt,
    a locking mechanism having a locking member attached to the spool to be rotatable therewith in a normal state and capable of locking the spool in an emergency state,
    a torsion bar disposed between the spool and the locking member for absorbing kinetic energy of a passenger when the spool rotates in a direction that the seat belt is withdrawn relative to the locking member in an emergency situation,
    a stopper screwed in a shaft of the locking member to be movable in an axial direction along the shaft of the locking member when the spool rotates relative to the locking member, said stopper locking the spool not to rotate when the locking member locks the stopper not to move in the axial direction, and
    an energy-absorption pin member disposed in one of the stopper and the locking member and situated between the stopper and the locking member, said pin member being configured for shear-deformation proximate a periphery of the one of the stopper and locking member in which the pin member is disposed, when the stopper moves in the axial direction along the shaft of the locking member.

2. A seat belt retractor according to claim 1, wherein said torsion bar and energy-absorption member are disposed separately.

3. A seat belt retractor according to claim 1, further comprising a cutter disposed on one of the stopper and the locking member for cutting the energy-absorption pin member when the stopper moves along the shaft of the locking member.

4. A seat belt retractor according to claim 3, wherein said cutter includes an edge having an acute angle.

5. A seat belt retractor according claim 3, wherein the cutter is a ring-shaped element which is separate from the stopper and the locking member.

6. A seat belt retractor according claim 1, wherein the pin member is arranged to project essentially radially out of the one of the stopper and the locking member in which it is disposed.

7. A seat belt retractor according claim 1, further comprising at least one additional pin member which is disposed in one of the stopper and the locking member and which is arranged to project essentially radially with respect to the one of the stopper and the locking member in which it is disposed.

8. A seat belt apparatus comprising a seat belt retractor according to claim 1, a tang slidably inserting the seat belt, and a buckle to be attached to the tang.

* * * * *